US010971158B1

(12) United States Patent
Patangay et al.

(10) Patent No.: US 10,971,158 B1
(45) Date of Patent: Apr. 6, 2021

(54) DESIGNATING ASSISTANTS IN MULTI-ASSISTANT ENVIRONMENT BASED ON IDENTIFIED WAKE WORD RECEIVED FROM A USER

(71) Applicant: Facebook, Inc., Menlo Park, CA (US)

(72) Inventors: Girish Patangay, Los Altos, CA (US); Nicholas John Shearer, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 95 days.

(21) Appl. No.: 16/153,592

(22) Filed: Oct. 5, 2018

(51) Int. Cl.
*G10L 15/32* (2013.01)
*H04L 29/08* (2006.01)
*G10L 15/22* (2006.01)
*G10L 15/08* (2006.01)
*G10L 15/30* (2013.01)

(52) U.S. Cl.
CPC .............. *G10L 15/32* (2013.01); *G10L 15/08* (2013.01); *G10L 15/22* (2013.01); *G10L 15/30* (2013.01); *H04L 67/10* (2013.01); *H04L 67/20* (2013.01); *H04L 67/32* (2013.01); *G10L 2015/088* (2013.01)

(58) Field of Classification Search
CPC .. G06F 16/3329; G06F 16/9535; G06F 3/167; G06F 40/20; G06F 40/279; G06F 16/243; G06F 16/90332; G06F 16/3344; G06F 40/30; G06F 40/40; G10L 15/22; G10L 2015/223; G10L 15/20; G10L 15/28; G10L 2015/088; G10L 15/00; G10L 15/005; G10L 13/086; G10L 15/18; G10L 15/14; G10L 17/00
See application file for complete search history.

(56) References Cited

U.S. PATENT DOCUMENTS

| | | | | |
|---|---|---|---|---|
| 9,172,747 | B2* | 10/2015 | Walters | G06Q 30/02 |
| 10,777,195 | B2* | 9/2020 | Fox | G10L 15/22 |
| 10,811,015 | B2* | 10/2020 | Smith | H04R 3/005 |
| 2013/0325780 | A1* | 12/2013 | Prakash | G06F 16/9535 |
| | | | | 706/46 |
| 2019/0013019 | A1* | 1/2019 | Lawrence | G06F 3/167 |
| 2019/0130898 | A1* | 5/2019 | Tzirkel-Hancock | G06F 3/167 |
| 2019/0180770 | A1* | 6/2019 | Kothari | G06N 20/00 |
| 2019/0196779 | A1* | 6/2019 | Declerck | G10L 15/22 |
| 2019/0251960 | A1* | 8/2019 | Maker | G10L 15/08 |
| 2019/0304443 | A1* | 10/2019 | Bhagwan | G10L 15/22 |
| 2020/0092123 | A1* | 3/2020 | Smith | H04W 4/025 |
| 2020/0105256 | A1* | 4/2020 | Fainberg | G10L 15/16 |
| 2020/0105273 | A1* | 4/2020 | O3 Donovan | G10L 15/22 |

* cited by examiner

*Primary Examiner* — Linda Wong
(74) *Attorney, Agent, or Firm* — Fenwick & West LLP (57) ABSTRACT

A central authority receives a wake word associated with a service request from a user of a client device. The central authority sends the received wake word to a set of wake word engines. The central authority receives a signal from a selected wake word engine indicating that an assistant associated with the selected wake word engine has been selected by the user based on the received wake word. The central authority transmits a signal blocking the remainder of the wake word engines from receiving additional wake words, and sends the service request to the assistant. Responsive to the assistant receiving the service request, the central authority transmits a signal unblocking the remainder of the wake word engines from receiving wake words.

18 Claims, 4 Drawing Sheets

DESIGNATING ASSISTANTS IN MULTI-ASSISTANT ENVIRONMENT BASED ON IDENTIFIED WAKE WORD RECEIVED FROM A USER

BACKGROUND

This disclosure relates generally to designating an assistant to service a request from a user, and more specifically to designating an assistant based on a wake word identified by a wake word engine.

Smart devices have become increasingly prevalent as demand grows from users for digital assistant devices to manage aspects their daily lives. This increased user demand has resulted in a variety of assistants used to monitor and control various functions within a home or office environment. For example, a user may rely on multiple assistants used to maintain a certain temperature within the user's home throughout a given day of the week, monitor electricity consumption and/or water usage, open various applications on a client device, order requested items online, and the like.

In most instances, these assistants require a phonetic input from the user, or a "wake word," to indicate to the assistant that it has been selected for use. However, given the abundance of seemingly unrelated assistants within a given environment, designating a particular assistant to service a request using a wake word, or series of wake words, may result an unintended need to specify which assistant will be used in advance to their use. This reduces the functionality of other assistants in the user's environment, and the versatility of the environment as a whole. In addition, the user's environment may not account for notifying the user of instances in which an assistant within the environment may be better equipped to handle a given service than an assistant designated by the user, or protect the user's privacy as third-party systems associated with assistants receive data from a user regardless of being invoked by the user.

SUMMARY

A home communication device hosts multiple assistants where each assistant responds to a user's command with content from an app or remote service provider. The device includes a central authority that can selectively activate/deactivate each assistant to service a request received from a user based on an identified wake word. The central authority receives a wake word associated with a service request from a user of a client device. The wake word recognition system sends the received wake word to a set of wake word engines, where each wake word engine is associated with a particular wake word and an assistant of a set of assistants in the assistant designation system. The central authority receives a signal from a selected wake word engine indicating that an assistant associated with the selected wake word engine has been selected by the user based on the received wake word. The central authority transmits a signal that blocks the remainder of the wake word engines from receiving additional wake words, and sends the service request to the assistant associated with the selected wake word engine. Upon identifying that the assistant has received the service request, the central authority transmits a signal that unblocks the remainder of the wake word engines from receiving wake words.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
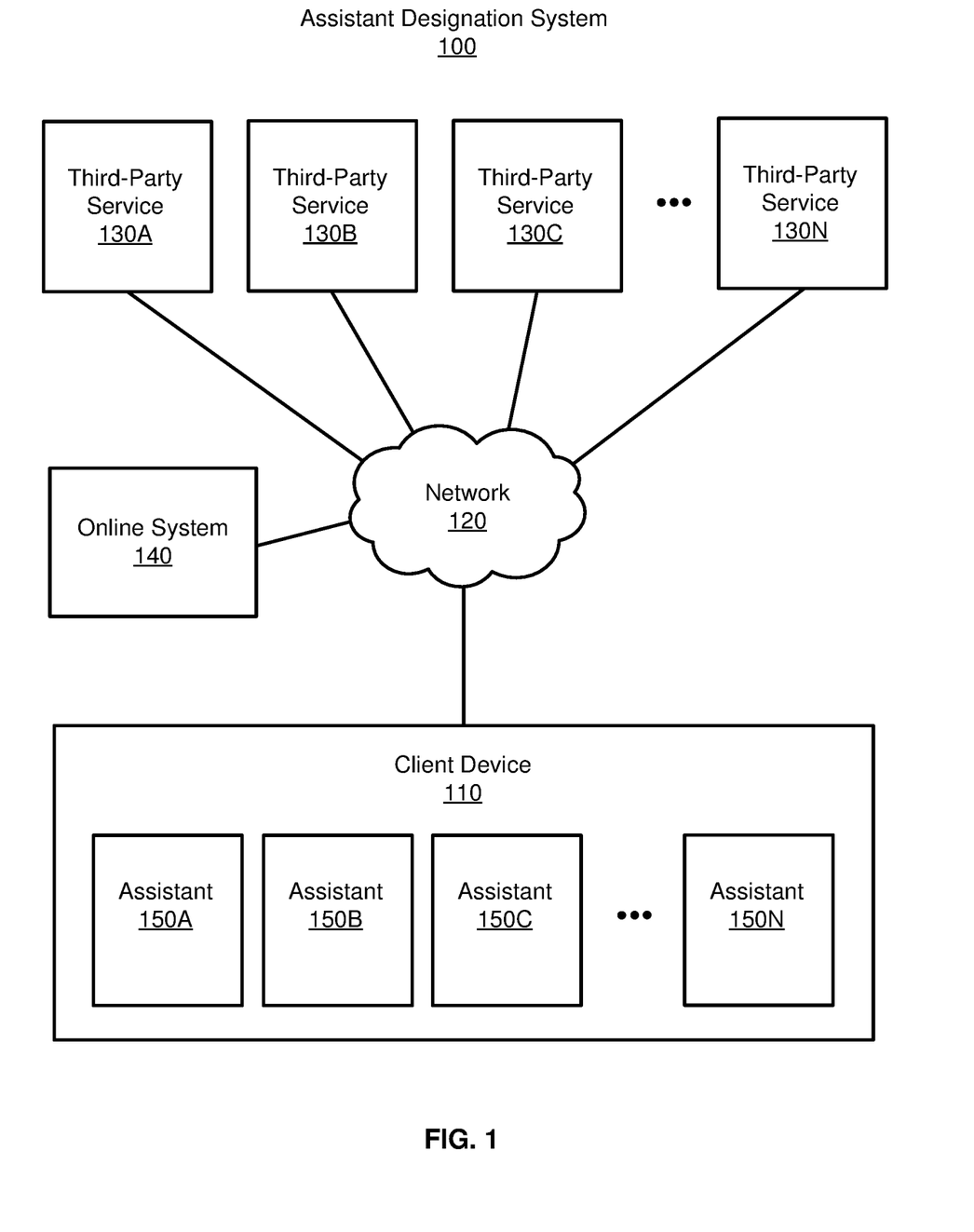
FIG. 1 is a block diagram of a system environment in which an assistant designation system operates, according to one embodiment.

FIG. 1 is a block diagram of an assistant designation system 100, according to one embodiment. In the embodiment illustrated in FIG. 1, the assistant designation system 100 includes one or more third-party services 130A-N, an online system 140, a network 120, a client device 110, and one or more assistants 150A-N. In alternative configurations, different and/or additional components may be included in the system 100. For example, the online system 140 is a social networking system, a content sharing network, or another system providing content to users.

The client device 110 is a computing device capable of receiving user input as well as transmitting and/or receiving data via the network 120. In one embodiment, the client device 110 is a conventional computer system, such as a desktop or a laptop computer. Alternatively, client device 110 may be a device having computer functionality, such as a personal digital assistant (PDA), a mobile telephone, a smartphone, or another suitable device. Client device 110 is configured to communicate via the network 120. In one embodiment, the client device 110 executes an application allowing a user of the client device 110 to interact with the online system 140. For example, the client device 110 executes a browser application to enable interaction between the client device 110 and the online system 140 via the network 120. In another embodiment, the client device 110 interacts with the online system 140 through an application programming interface (API) running on a native operating system of the client device 110, such as IOS® or ANDROID™. The client device 110 may additionally include one or more audio and image capture devices configured to capture audio and image data of a local area surrounding the client device 110.

As further described below in conjunction with FIG. 2, the client device 110 includes an internal set of devices, or "wake word engines," used to identify phonetic or verbal input from a user, or "wake words." Each wake word engine in the client device 110 is associated with a respective wake word that is different relative to the other wake word engines. In response to receiving notification that a wake word engine has identified its associated wake word, the client device designates an assistant associated with the identified wake word to service a request from the user that follows the wake word.

The client device 110 is configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Third-party systems 130A-N may be coupled to the network 120 for communicating with the client device 110, assistants 150A-N, and/or the online system 140. In one embodiment, a third-party system 130 is a service provider that provides services to a user via an assistant 150. For example, a third-party system 130 may be communicatively linked to an assistant 150 via the network 120 such that the third-party system 130 provides the assistant 150 instructions to service a request from a user (e.g., adjust a thermostat, launch a music application, adjust a light source, and the like). In another embodiment, a third-party system 130 is an application provider communicating information describing applications for execution by the client device 110. In other embodiments, a third-party system 130 provides content or other information for presentation via the client device 110. A third-party system 130 may also communicate information to the online system 140, such as advertisements, content, or information about an application provided by the third-party system 130.

Assistants 150A-N are configured to perform services for a user. Each assistant is communicatively linked with the client device 110 and one or more corresponding third-party systems 130A-N via the network 120. In one embodiment, assistants are hardware devices located throughout a user's home or office environment that receive requests for services from a user, or "service requests," via the client device 110. In another embodiment, assistants may be virtual assistants located on the client device 110. In yet another embodiment, assistants may be software and/or hardware or any combination thereof. Each assistant 150A-N in the assistant designation system 100 is configured to perform one or more specific services for a user. For example, assistant 150A might be used to open requested applications on a client device for a user, while assistant 150B may comprise a thermostat control system in the user's home. Each assistant is associated with a wake word used to cause the assistant to become available to receive a service request from the user.

Figure 2:
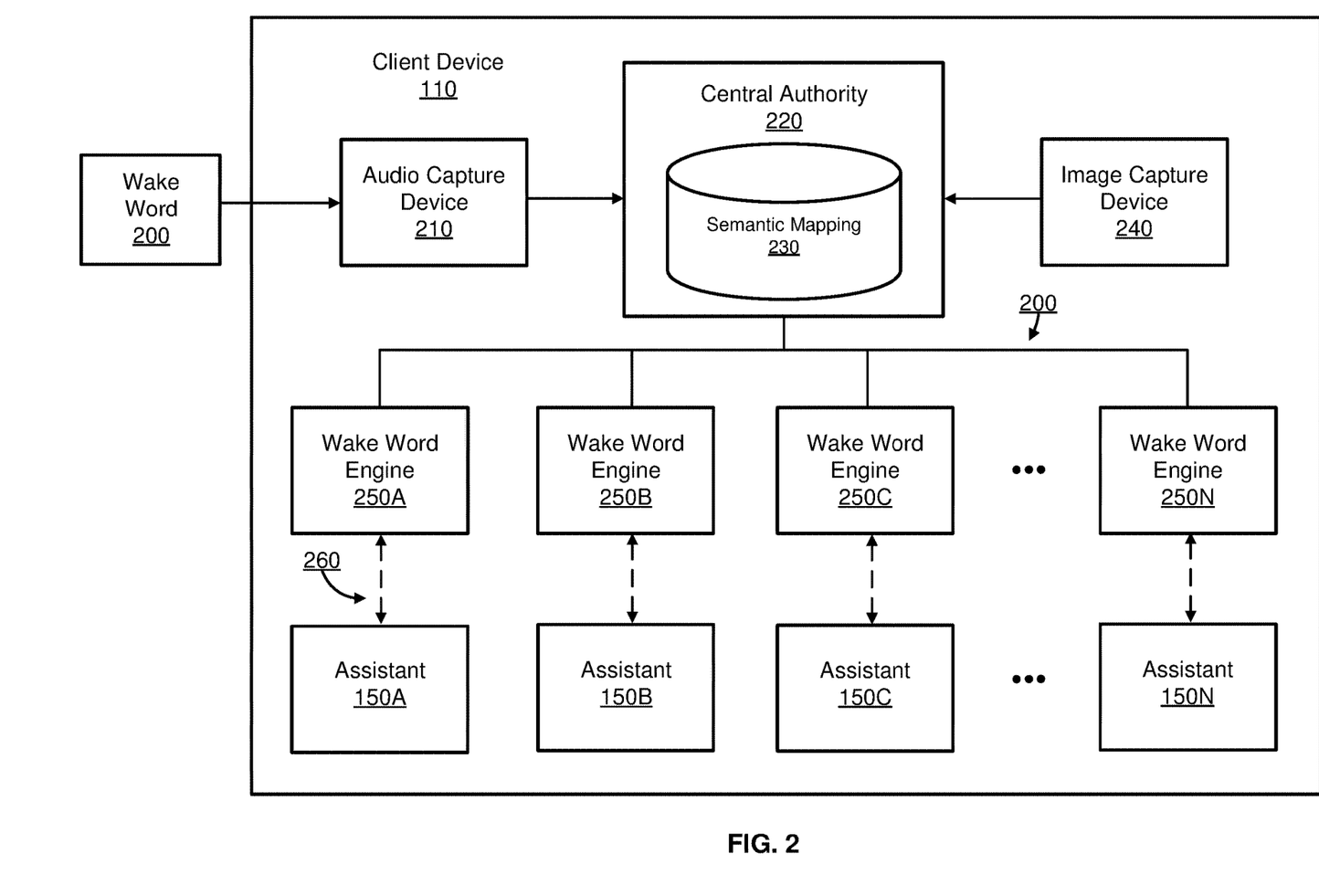
FIG. 2 is a block diagram of a client device, in accordance with an embodiment.

FIG. 2 is a block diagram illustrating a client device 110, according to one embodiment. In the embodiment illustrated in FIG. 2, the client device 110 includes an audio capture device 210, an image capture device 240, a central authority 220, and one or more wake word engines 250A-N. However, in other embodiments, the client device 110 includes different and/or additional components than those shown in FIG. 2.

Wake word 200 is a word spoken by a user that serves as phonetic input received by the client device 110. In one embodiment, the wake word 200 is a word spoken by the user that addresses a particular assistant 150 (e.g., by name) of the one or more assistants 150A-N to service a request. For example, if a user prefers assistant 150A to perform a particular service, the user may address assistant 150A directly, such as by verbally saying "assistant 150A" where it is captured by the audio capture device 210 of the client device 110. In other embodiments, a user may select an assistant using various means other than phonetic input (e.g., user interface, motion gesture, predictive machine learned model, and the like). In response to identifying the wake word (e.g., using a wake word engine) the client device 110 transmits a signal 260 to the selected assistant indicating that the assistant has been selected in accordance with the received wake word.

Each wake word 200 is phonetically followed with a service request from a user directed to the assistant associated with the wake word 200. For example, if a user would like a particular assistant to perform a service, the user can say the wake word 200 belonging to the assistant into an audio capture device 210 in the client device 110, and subsequently verbally specify the service to be performed by the assistant. For example, if a user would like assistant 150B to adjust the thermostat in the user's home, the user could first provide the client device 110 with a wake word (e.g., "hey, assistant 150B") followed by an instruction to the assistant to adjust the thermostat (e.g., "lower the temperature to 64 degrees"). In this example, the client device 110 would identify the wake word "assistant 150B," identify the selected assistant, and send the instruction "lower the temperature to 64 degrees" to the selected assistant for servicing.

The audio capture device 210 is used by the client device 110 for receiving wake word 200 input from a user. In one embodiment, the audio capture device 210 is a microphone that detects a wake word 200 spoken by a user directly into the client device 110. In another embodiment, the audio capture device 210 is comprised of an array of microphones configured to identify a wake word 200 within a local area surrounding the client device 110 (e.g., a user's living room, kitchen, bedroom, and the like). The audio capture device 210 captures audio signals from different regions within a local area surrounding the client device 110. In various embodiments, the audio capture device 210 is coupled to the central authority 220, which propagates the received wake word 200 to a set of wake word engines 250 within the client device 110.

The wake word engines 250A-N are configured to identify a wake word 200 received from a user of the client device 110. Each wake word engine 250A-N is associated with a wake word 200 and one or more assistants 150A-N. In one embodiment, each assistant associated with a wake word engine assumes a low-power state prior to its corresponding wake word engine receiving its wake word. Wake word engines 250A-N run in parallel on the client device 110 while waiting to receive their respective wake words from a user. In one embodiment, each wake word engine applies one or more models, such as machine learned models (e.g., neural networks) or other sound recognition models, to audio data captured by the audio capture device 210 from a region of the local area surrounding the client device 110. Each wake word engine applies the one or more models to determine whether the audio data includes a wake word 200 from a user. Upon identifying its wake word 200 in the audio data, a selected wake word engine sends a signal to the central authority 220 indicating that the wake word engine has been selected by the user. In one embodiment, the selected wake word engine additionally sends a signal 260 to its assistant instructing the assistant to exit the low-power state so that it may receive a request for a service from the user. In another embodiment, this signal 260 is sent by the central authority 220 responsive to receiving the signal from the selected wake word engine.

The central authority 220 designates one or more assistants to service requests from users of the client device 110. In addition, the central authority 220 maintains user privacy while designating each assistant to service requests by isolating each request to its corresponding assistant. This ensures that a service request is not mistakenly sent to an assistant for processing at an unintended third-party system 130. The central authority 220 is configured to receive a wake word 200 from the audio capture device 210, propagate the received wake word 200 to each wake word engine 250A-N, and prevent the service request associated with the wake word from being sent to third-party systems unassociated with the wake word.

In one embodiment, the central authority 220 isolates service requests from a user by transmitting a signal that blocks each wake word engine not selected by the user, and quickly transmitting an additional signal that unblocks each of the blocked wake word engines after the user has delivered a service request. Responsive to receiving a signal from a selected wake word engine indicating that the received wake word 200 has been identified, the central authority 220 blocks the remaining wake word engines in the client device 110 (i.e., every wake word engine other than the selected wake word engine), by instructing the remaining wake word engines to enter a low-power state, for example. In another embodiment, the central authority 220 may grant a lock (e.g., mutex lock, semaphore, etc.) to the selected wake word engine. This prevents one or more of the remaining wake word engines from becoming invoked with one or more additional wake words received by the client device 110 prior to the user providing the service request to the designated assistant. For example, if a user would like to use assistant 150N to dim a light source in the user's home, the central authority 220 receives a signal from assistant 150N indicating that it has been selected by the user, and subsequently blocks each wake word engine not selected by the user before the user instructs assistant 150N to dim the lights.

Blocking the remainder of wake word engines accounts for the possibility that the user may (inadvertently or otherwise) invoke one or more additional wake word engines by saying additional wake words before providing the service request. For example, if the tells the client device "hey assistant 150A, tell assistant 150B to dim the lights," the service request would first be sent to the third-party system 130A associated with assistant 150A for processing (e.g., exposing the user's identity and service request), and next be sent to the third-party system 130B associated with assistant 150B similarly. If the central authority 220 did not account for such instances, each wake word engine invoked by the additional wake words would send a signal 260 to its assistant instructing the assistant to exit the low-power state so that it may receive the service request from the user. In doing so, the service request would be received by each of these assistants, and processed by the third-party systems associated with the assistants, thus excessively exposing the user's identity and service request to those third-party systems that do not process the request.

Because the central authority 220 transmits a signal that blocks the remainder of the wake word engines that are not selected by a user, the central authority 220 transmits a signal that unblocks the remainder of the wake word engines after the user has delivered a service request so that they may receive wake words for additional service requests. In one embodiment, the central authority 220 unblocks the remainder of the wake word engines in response to identifying that the service request has been received by the designated assistant. In another embodiment, the central authority 220 detects that the phonetic input following the wake word 200 has ended (i.e., the service request has been delivered by the user to the assistant), and unblocks the remainder of the wake word engines. In this embodiment, the central authority 220 may employ various forms of speech signal processing (e.g., endpoint detection, digital signal processing, etc.) to identify that the user has completed the service request. Upon identifying that the user has completed the service request, the central authority 220 unblocks the remainder of the wake word engines so that they may identify the next wake word 200 given by the user.

In one embodiment, the central authority 220 identifies instances in which a user has selected an assistant to service a request that the assistant is incapable of servicing, and performs intent resolution to identify an assistant (or assistants) capable of performing the service. In particular, the central authority 220 includes a semantic mapping 230 that maintains an inventory of assistants 150A-N within the assistant designation system 100, as well as the services they are capable of providing. Each of the services mapped to a given assistant in the semantic mapping represent a subset of the overall services available in the assistant designation system 100. For example, if the central authority 220 receives a request for an assistant typically used for opening applications on the client device, and receives a subsequent service request from the user for the assistant to adjust the thermostat in the user's home, the central authority 220 can identify an assistant within the semantic mapping 230 capable of controlling the thermostat. In one embodiment, this intent resolution using the semantic mapping 230 is performed by the online system 140, and the identification of the appropriate assistant is sent to the central authority 220 so that it may be selected to service the request.

In one embodiment, an assistant selected to receive a service request that it is incapable of performing may poll the central authority 220 to identify another assistant within the assistant designation system 100 that is capable of performing the service request. Once the central authority 220 identifies an assistant capable of performing the service request (e.g., using the semantic mapping 230), the central authority 220 transmits a signal to the incapable assistant indicating an assistant that is capable of performing the service request. The incapable assistant may then suggest to the user the assistant that is capable of performing the service request (e.g., via verbal communication, user interface, etc.). For example, if an assistant that typically services requests for changes in the temperature of a home environment receives a service request to make an online purchase, the assistant may verbally communicate to the user "I am unable to perform this service." The assistant may then poll the central authority 220 to identify the appropriate assistant, and suggest to the user "here is another assistant you might like to use instead." The user may then decide whether or not to use the appropriate assistant.

The image capture device 240 captures video data or images of a local area surrounding the client device 110 and within a field of view of the image capture device 240. In some embodiments, the image capture device 240 includes one or more cameras, one or more video cameras, or any other device capable of capturing image data or video data. Additionally, the image capture device 240 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 240. Hence, modifying one or more parameters of the image capture device 240 modifies video data or image data captured by the image capture device 240 after modification of the one or more parameters. While FIG. 2 shows a single image capture device 240 included in the client device 110, in other embodiments, the client device 110 includes any suitable number of image capture devices 240. In various embodiments, users have the options to prevent any recordings (video, voice, etc.) from being stored locally in the client device and/or on the cloud and also to delete any recordings, if saved.

The central authority 220 can identify a user and use the identification to predict an assistant 150A-N that the user will most likely select for a service request. In one embodiment, the user is identified based on captured video and/or audio data collected by the image capture device 240 and/or audio capture device 210, respectively. In another embodiment, the central authority 220 may identify the user based on biometric information (e.g., fingerprint, facial recognition, etc.) collected by a biometric device on the client device 110. Once the user is identified, the central authority 220 may predict which assistant 150A-N the user will select to service a request. In one embodiment, the central authority 220 may use historical interaction data indicating which wake word engines 250A-N have received the most wake words 200 throughout a threshold time period to predict an assistant 150A-N. In another embodiment, the central authority 220 may employ a machine learned model (e.g., neural network) to make the prediction. In response to making a prediction, the central authority 220 may initialize the predicted assistant by sending corresponding wake word engine the predicted wake word. The central authority 220 then transmits a signal that blocks the remainder of unselected wake word engines (e.g., instructing the unselected wake word engines to enter the low-power state, granting mutex lock and/or semaphore to selected wake word engine, etc.). Upon receiving a wake word 200 from the user, the central authority 220 analyzes the received wake word 200 by comparing the received wake word 200 with the predicted wake word to identify a match. If a match exists, the central authority 220 then sends the service request associated with the received wake word 200 to the predicted assistant. If a mismatch between the received wake word 200 and the predicted wake word exists, the central authority 220 transmits a signal that blocks the wake word engine associated with the predicted assistant, transmits a signal that unblocks the wake word engine corresponding to the received wake word 200 (e.g., by sending the received wake word 200 to the wake word engine), and sends the service request associated with the received wake word 200 to the assistant. In addition, the central authority 220 may use the received wake word 200 as training data to further train the machine learned model to make more accurate predictions in the future.

In one embodiment, the central authority 220 may learn a user's preferences (e.g., for a particular assistant and/or functionality) over time based on usage patterns of each assistant to select an assistant for the user prior to receiving a wake word. For example, an identified user may routinely prefer a given assistant over other assistants based on the particular functionality offered by the assistant. The central authority 220 creates statistical data based on these usage patterns, and uses the statistical data to programmatically determine which assistant the identified user will most likely select. In one embodiment, the statistical data specifies a particular functionality preferred by the identified user. For example, if a user typically prefers to use assistant 150A for opening a music application, and routinely uses assistant 150B to control a thermostat in the user's home, the central authority 220 may use this statistical data to select assistant 150A when it is identified that the user would like to listen to music (e.g., based on user identity, time of day, and the like). In another embodiment, the statistical data corresponds to usage patterns of one or more assistants. For example, if a user regularly uses assistant 150C more frequently than the other assistants in the assistant designation system 100, the central authority 220 uses this statistical information to select assistant 150C to receive service requests from the user. In yet another embodiment, statistical data describes, both, preferred functionality and usage patterns over time. The statistical data is used to programmatically determine the identified user's preferred assistant (e.g., using machine trained model). Once the preferred assistant is determined, the central authority 220 initializes the preferred assistant by transmitting its wake word to the corresponding wake word engine so that it may receive a service request from the identified user.

The online system 140 and the central authority 220 of the client device 110 cooperatively or individually maintain and enforce one or more privacy settings for users or people identified from captured video data or other data in various embodiments. A privacy setting of a user or a person determines how particular information associated with a user or a person can be shared, and may be stored in association with information identifying the user or the person. In some embodiments, the central authority 220 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third-party systems 130 or any entity that can potentially access the information. Examples of information that can be shared by a user include image data including the user or the person, audio data including audio captured from the user or the person, video data including the user or the person, and the like.

For example, in particular embodiments, privacy settings may allow a user to specify (e.g., by opting out, by not opting in) whether the online system 140 may receive, collect, log, or store particular objects or information associated with the user for any purpose. In particular embodiments, privacy settings may allow the user to specify whether particular video capture devices, audio capture devices, applications or processes may access, store, or use particular objects or information associated with the user. The privacy settings may allow the user to opt in or opt out of having objects or information accessed, stored, or used by specific devices, applications or processes. The online system 140 may access such information to provide a particular function or service to the user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example, and not by way of limitation, a user may transmit a message to another user via an application related to the online system 140 (e.g., a messaging app), and may specify privacy settings that such messages should not be stored by the online system 140.

The privacy settings maintained and enforced by the online system 140 or the central authority 220 may be associated with default settings. In various embodiments, the central authority 220 does not identify a user within captured video data, audio data, image data, or other data unless the central authority 220 obtains a privacy setting from the user authorizing the central authority 220 to identify the user. For example, a privacy setting associated with a user has a default setting preventing the central authority 220 from identifying the user, so the central authority 220 does not identify the user unless the user manually alters the privacy setting to allow the central authority 220 to identify the user. Additionally, an alternative privacy setting regulates transmission of information from the client device 110 identifying the user to another entity (e.g., another client device 110, the online system 140, a third-party system 130) in various embodiments. The alternative privacy setting has a default setting preventing transmission of information identifying the user in various embodiments, preventing the central authority 220 from transmitting information identifying the user to other entities unless the user manually modifies the alternative privacy setting to authorize transmission). The central authority 220 maintains the one or more privacy settings for each user identified from captured video data or other data, allowing user-specific control of transmission and identification of each user. In some embodiments, the central authority 220 prompts a person to provide privacy settings when the central authority 220 initially identifies the person from captured data and stores the provided privacy settings in association with information identifying the person.

In various embodiments, for the online system 140 or various components of client device 110 that have functionalities that may use, as inputs, personal or biometric information of a user for user-authentication or experience-personalization purposes, a user may opt to make use of these functionalities to enhance their experience using the device and the online system 140. As an example, and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example, and not by way of limitation, the online system 140 may provide a functionality for a user to provide voice-print recordings to the online system 140. As an example, and not by way of limitation, if a user wishes to use this function of the online system 140, the user may provide a voice recording of his or her own voice to provide a status update via the online system 140. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition to use voice-operated features of the online system 140), and further specify that such voice recording may not be shared with any third-party system 130 or used by other processes or applications associated with the online system 140. As another example, and not by way of limitation, the online system 140 may provide a functionality for a user to provide a reference image (e.g., a facial profile) to the online system 140. The online system 140 may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the online system 140. Any of such restrictions on capture biometric and/or other personal data may also be applied to the client device 110.

Users may authorize the capture of data, identification of users, and/or sharing and cross-application use of user-related data in one or more ways. For example, user may pre-select various privacy settings before the users use the features of the client device 110 or take actions in the online system 140. In another case, a selection dialogue may be prompted when users first carry out an action or use a feature of the client device 110 or the online system 140 or when users have not carried out the action or used the feature for a predetermined period of time. In yet another example, the client device 110 and the online system 140 may also provide notifications to the users when certain features that require user data begin to operate or are disabled due to users' selections to allow users to make further selections through the notifications. Other suitable ways for users to make authorizations are also possible.

In some embodiments, the central authority 220 obtains information maintained by the online system 140 or from one or more third-party systems 130 for a user identified from captured video data, subject to privacy settings for the user. Based on video data, audio data, image data, or other data including the user previously captured by the client device 110 and the obtained information, the central authority 220 may generate content for presentation to the user via the client device 110. For example, the central authority 220 overlays content items from the online system 140 associated with one or more objects identified by the central authority 220 from video data or image data captured by the client device 110. Alternatively, the online system 140 generates content for the user based on video data, image data, audio data, or other data including the user received from the client device 110 and information maintained by the online system 140 for the user (or obtained from one or more third-party systems 130 by the online system 140) and provides the generated content to the client device 110 for presentation to the user.

Figure 3:
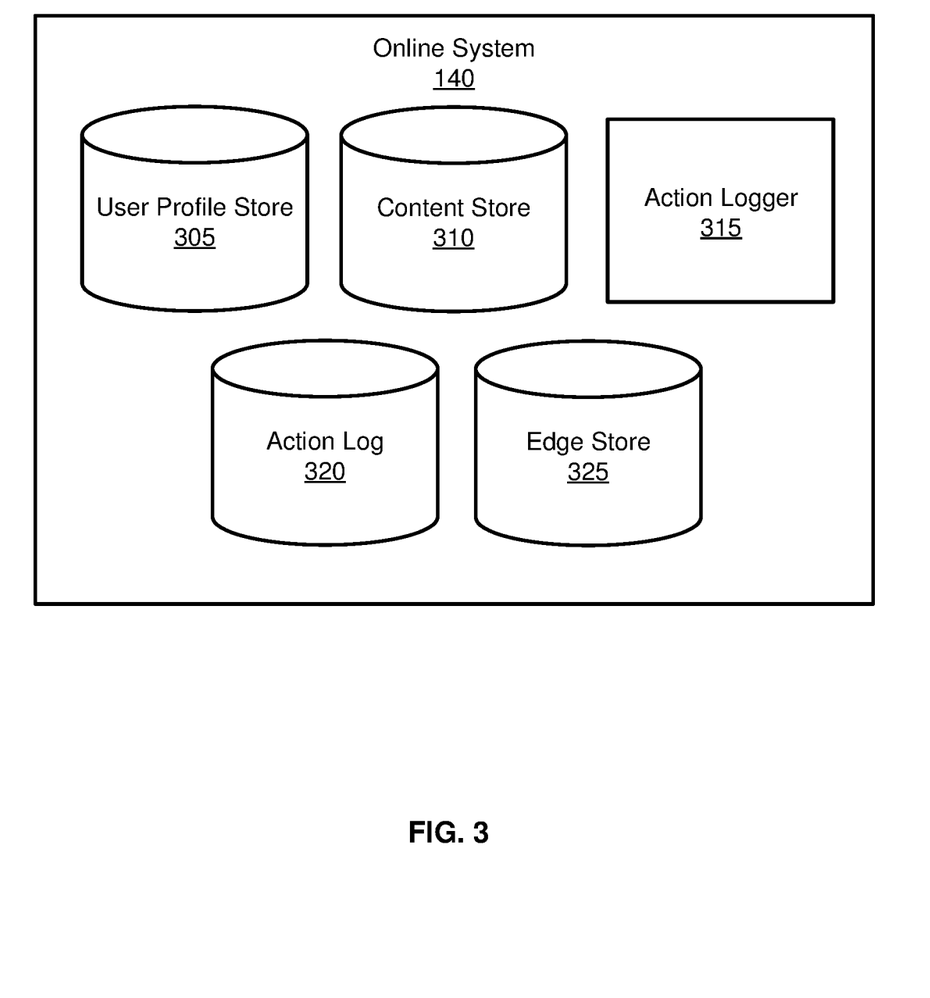
FIG. 3 is a block diagram of an online system, according to one embodiment.

FIG. 3 is a block diagram of an architecture of the online system 140, according to one embodiment. In the embodiment illustrated in FIG. 3, the online system 140 includes a user profile store 305, a content store 310, an action logger 315, an action log 320, and an edge store 325. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third-party system 130. For example, targeting criteria identifies users that have taken a particular action, such as sent a message to another user, used an application, joined a group, left a group, joined an event, generated an event description, purchased or reviewed a product or service using an online marketplace, requested information from a third-party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Based on the privacy settings, the action logger 315 may be authorized to receive communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

Based on the privacy settings, the action log 320 may be authorized to be used by the online system 140 to track user actions on the online system 140, as well as actions on third-party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third-party system 130, such as an external website, and communicated to the online system 140, subject to the privacy settings of the users. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third-party system 130, including webpage viewing histories, advertisements that were engaged, purchases made, and other patterns from shopping and buying. Additionally, actions a user performs via an application associated with a third-party system 130 and executing on the client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

Figure 4:
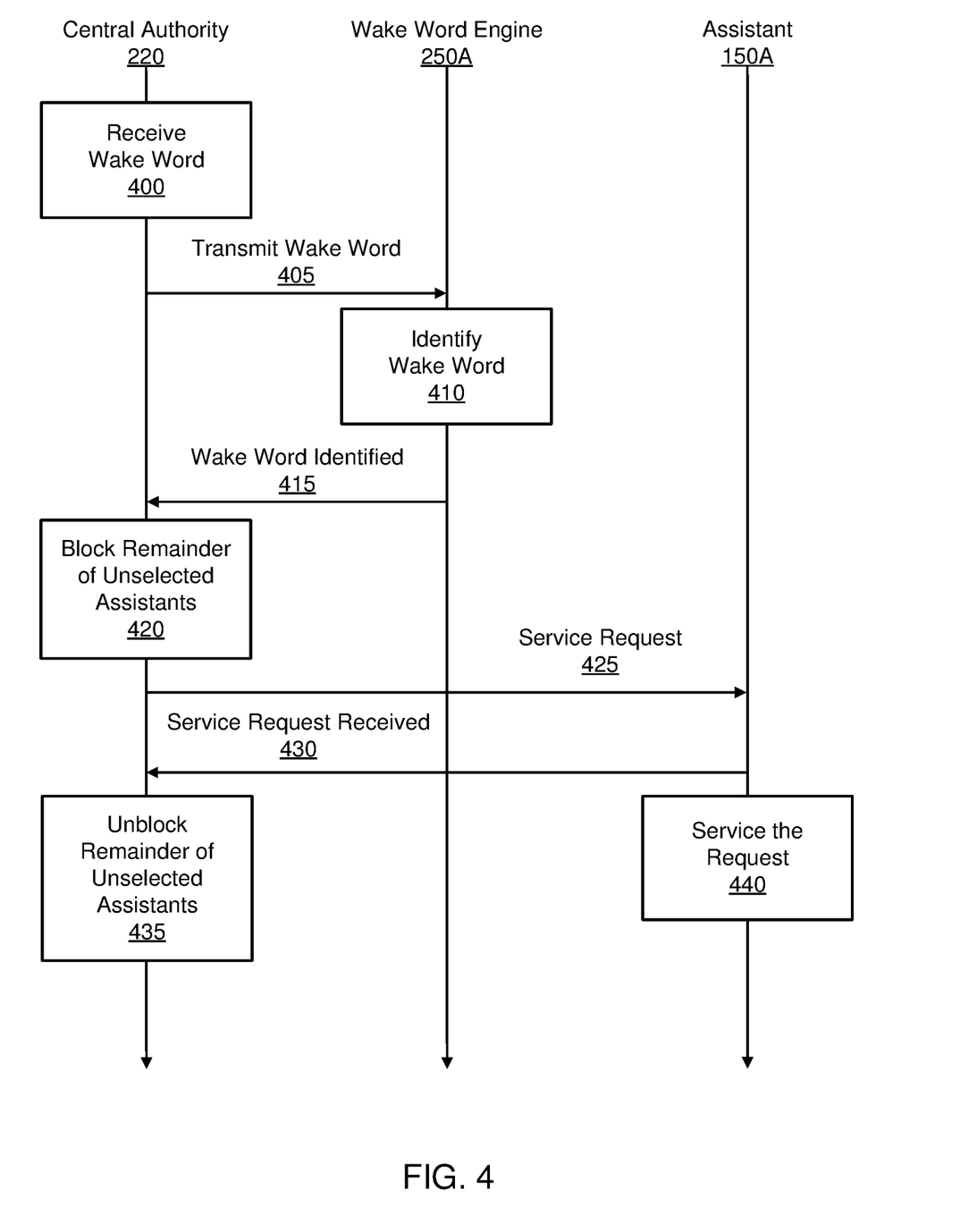
FIG. 4 is an interaction diagram of one embodiment of a method for selecting an assistant to service a request received from a user based on an identified wake word, according to one embodiment.

FIG. 4 illustrates an interaction diagram between the central authority 220, a selected wake word engine 250A, and its associated assistant 150A, according to one embodiment. In the embodiment illustrated in FIG. 4, the central authority receives 400 a wake word from a user and transmits 405 the wake word to the wake word engines. The selected wake word engine 250A corresponding to the received wake word identifies 410 the transmitted wake word. Wake word engine 250A transmits 415 a signal to central authority 220 indicating that the wake work has been identified. The central authority 220 transmits a signal that blocks 420 the remainder of the unselected assistants (e.g., instructing the remainder of the unselected wake word engines to enter a low-power state, granting the selected wake word engine a mutex lock and/or semaphore, etc.). In one embodiment, the central authority 220 sends 425 the service request to the assistant 150A associated with the selected wake word engine 250A. In another embodiment, the assistant 150A receives the service request from the user of the client device. The assistant 150A transmits 430 a signal indicating to the central authority 220 that the service request has been received. The central authority 220 transmits a signal that unblocks 435 the remainder of the unselected assistants, and the assistant 150A services 440 the request from the user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for invoking an assistant of a plurality of assistants on a client device, the method comprising:
    capturing, by an audio capture device of the client device, a wake word associated with a service request;
    sending, by a central authority of the client device, the received wake word to each of a plurality of wake word engines in parallel, each wake word engine associated with a particular wake word and an assistant of the plurality of assistants;
    receiving, by the central authority, a signal from a selected wake word engine, the selected wake word engine associated with the received wake word, the signal indicating that an assistant associated with the selected wake word engine has been selected by the user;
    responsive to receiving the signal from the selected wake word engine, transmitting, by the central authority, a signal that blocks a remainder of the plurality of wake word engines other than the selected wake word engine from receiving one or more additional wake words;
    sending the service request from the central authority to the assistant associated with the selected wake word engine;
    transmitting, by the central authority, a signal that unblocks each of the remainder of the plurality of wake word engines from receiving the one or more additional wake words in response to determining the selected wake word engine has received the service request;
    identifying the user of the client device;
    predicting, by the central authority, an assistant of the plurality of assistants that the identified user will most likely request for services, the predicting based on a historical interaction;
    initializing, by the central authority, the predicted assistant, the initializing comprising sending a predicted wake word to a wake word engine associated with the predicted assistant;
    transmitting, by the central authority, a signal that blocks a remainder of the plurality of wake word engines from receiving one or more additional wake words;
    comparing, by the central authority, the received wake word to the predicted wake word, the comparing comprising analyzing the received wake word to identify a match between the received wake word and the predicted wake word; and
    responsive to identifying a match between the received wake word and the predicted wake word:
        sending, by the central authority, the service request to the predicted assistant.

2. The method of claim 1, wherein each assistant of the plurality of assistants is associated with a third-party system.

3. The method of claim 1, wherein the signal that blocks the remainder of the plurality of wake word engines from receiving the one or more additional wake words comprises:
    disabling, by the central authority, a remainder of a plurality of assistants, the disabling causing each of the remainder of the plurality of assistants to be incapable of receiving the service request from the user, each of the remainder of the plurality of assistants associated with the remainder of the plurality of wake word engines.

4. The method of claim 1, further comprising:
identifying, by the central authority, each of the plurality of assistants;
generating, by the central authority, a standardized semantic mapping of services associated with the plurality of assistants, the standardized semantic mapping describing a subset of services capable of being performed by each of the plurality of assistants;
determining, by the central authority, whether the assistant associated with the selected wake word engine is incapable of servicing the service request from the user, the determining based on the standardized semantic mapping;
responsive to determining that the assistant associated with the selected wake word engine is incapable of servicing the service request from the user:
  determining, from the identified plurality of assistants, one or more assistants capable of servicing the service request, the determining based on the standardized semantic mapping; and
  designating, by the central authority, an assistant of the one or more assistants to service the service request from the user.

5. The method of claim 4, wherein designating the assistant of the one or more assistants to service the service request from the user comprises:
transmitting, by the central authority, a signal that blocks the selected wake word engine;
transmitting, by the central authority, a signal that unblocks a wake word engine associated with the designated assistant of the one or more assistants; and
sending, by the central authority, the service request to the designated assistant of the one or more assistants.

6. The method of claim 1, wherein comparing the received wake word to the predicted wake word further comprises:
responsive to identifying a mismatch between the received wake word and the predicted wake word:
  transmitting, by the central authority, a signal that blocks the wake word engine associated with the predicted assistant;
  transmitting, by the central authority, a signal that unblocks a wake word engine associated with the received wake word; and
  sending, by the central authority, the service request to the assistant associated with the received wake word.

7. The method of claim 1, wherein the user is identified using at least one of a camera and a biometric device, the camera and the biometric device located on the client device.

8. The method of claim 6, further comprising:
sending the received wake word for use in a machine learning model, wherein the machine learning model uses the received wake word as training data.

9. A non-transitory computer readable medium configured to store instructions, the instructions when executed by a processor cause the processor to perform steps comprising:
capturing, by an audio capture device of the client device, a wake word associated with a service request;
sending, by a central authority of the client device, the received wake word to each of a plurality of wake word engines in parallel, each wake word engine associated with a particular wake word and an assistant of a plurality of assistants;
receiving, by the central authority, a signal from a selected wake word engine, the selected wake word engine associated with the received wake word, the signal indicating that an assistant associated with the selected wake word engine has been selected by the user;
responsive to receiving the signal from the selected wake word engine, transmitting, by the central authority, a signal that blocks a remainder of the plurality of wake word engines other than the selected wake word engine from receiving one or more additional wake words;
sending the service request from the central authority to the assistant associated with the selected wake word engine;
transmitting, by the central authority, a signal that unblocks each of the remainder of the plurality of wake word engines from receiving the one or more additional wake words in response to determining the selected wake word engine has received the service request; and
identifying the user of the client device;
predicting, by the central authority, an assistant of the plurality of assistants that the identified user will most likely request for services, the predicting based on a historical interaction;
initializing, by the central authority, the predicted assistant, the initializing comprising sending a predicted wake word to a wake word engine associated with the predicted assistant;
transmitting, by the central authority, a signal that blocks a remainder of the plurality of wake word engines from receiving one or more additional wake words;
comparing, by the central authority, the received wake word to the predicted wake word, the comparing comprising analyzing the received wake word to identify a match between the received wake word and the predicted wake word; and
responsive to identifying a match between the received wake word and the predicted wake word:
sending, by the central authority, the service request to the predicted assistant.

10. The non-transitory computer readable medium of claim 9, wherein each assistant of the plurality of assistants is associated with a third-party system.

11. The non-transitory computer readable medium of claim 9, wherein the signal that blocks the remainder of the plurality of wake word engines from receiving the one or more additional wake words comprises:
disabling, by the central authority, a remainder of a plurality of assistants, the disabling causing each of the remainder of the plurality of assistants to be incapable of receiving the service request from the user, each of the remainder of the plurality of assistants associated with the remainder of the plurality of wake word engines.

12. The non-transitory computer readable medium of claim 9, further comprising:
identifying, by the central authority, each of the plurality of assistants;
generating, by the central authority, a standardized semantic mapping of services associated with the plurality of assistants, the standardized semantic mapping describing a subset of services capable of being performed by each of the plurality of assistants;
determining, by the central authority, whether the assistant associated with the selected wake word engine is incapable of servicing the service request from the user, the determining based on the standardized semantic mapping;

responsive to determining that the assistant associated with the selected wake word engine is incapable of servicing the service request from the user:
　determining, from the identified plurality of assistants, one or more assistants capable of servicing the service request, the determining based on the standardized semantic mapping; and
　designating, by the central authority, an assistant of the one or more assistants to service the service request from the user.

13. The non-transitory computer readable medium of claim 12, wherein designating the assistant of the one or more assistants to service the service request from the user comprises:
　transmitting, by the central authority, a signal that blocks the selected wake word engine;
　transmitting, by the central authority, a signal that unblocks a wake word engine associated with the designated assistant of the one or more assistants; and
　sending, by the central authority, the service request to the designated assistant of the one or more assistants.

14. The non-transitory computer readable medium of claim 9, wherein comparing the received wake word to the predicted wake word further comprises:
　responsive to identifying a mismatch between the received wake word and the predicted wake word:
　　transmitting, by the central authority, a signal that blocks the wake word engine associated with the predicted assistant;
　　transmitting, by the central authority, a signal that unblocks a wake word engine associated with the received wake word; and
　　sending, by the central authority, the service request to the assistant associated with the received wake word.

15. The non-transitory computer readable medium of claim 9, wherein the user is identified using at least one of a camera and a biometric device, the camera and the biometric device located on the client device.

16. The non-transitory computer readable medium of claim 14, further comprising:
　sending the received wake word for use in a machine learning model, wherein the machine learning model uses the received wake word as training data.

17. A computer system comprising:
a processor; and
a non-transitory computer readable medium configured to store instructions, the instructions when executed by the processor cause the processor to perform steps comprising:
　capturing, by an audio capture device of the client device, a wake word associated with a service request;
　sending, by a central authority of the client device, the received wake word to each of a plurality of wake word engines in parallel, each wake word engine associated with a particular wake word and an assistant of a plurality of assistants;
　receiving, by the central authority, a signal from a selected wake word engine, the selected wake word engine associated with the received wake word, the signal indicating that an assistant associated with the selected wake word engine has been selected by the user;
　responsive to receiving the signal from the selected wake word engine, transmitting, by the central authority, a signal that blocks a remainder of the plurality of wake word engines other than the selected wake word engine from receiving one or more additional wake words;
　sending the service request from the central authority to the assistant associated with the selected wake word engine;
　transmitting, by the central authority, a signal that unblocks each of the remainder of the plurality of wake word engines from receiving the one or more additional wake words in response to determining the selected wake word engine has received the service request; and
identifying the user of the client device;
predicting, by the central authority, an assistant of the plurality of assistants that the identified user will most likely request for services, the predicting based on a historical interaction;
initializing, by the central authority, the predicted assistant, the initializing comprising sending a predicted wake word to a wake word engine associated with the predicted assistant;
transmitting, by the central authority, a signal that blocks a remainder of the plurality of wake word engines from receiving one or more additional wake words;
comparing, by the central authority, the received wake word to the predicted wake word, the comparing comprising analyzing the received wake word to identify a match between the received wake word and the predicted wake word; and
responsive to identifying a match between the received wake word and the predicted wake word:
　sending, by the central authority, the service request to the predicted assistant.

18. The computer system of claim 17, wherein the signal that blocks the remainder of the plurality of wake word engines from receiving the one or more additional wake words comprises:
　disabling, by the central authority, a remainder of a plurality of assistants, the disabling causing each of the remainder of the plurality of assistants to be incapable of receiving the service request from the user, each of the remainder of the plurality of assistants associated with the remainder of the plurality of wake word engines.

\* \* \* \* \*